US012470118B2

(12) United States Patent
Ikezoe et al.

(10) Patent No.: US 12,470,118 B2
(45) Date of Patent: Nov. 11, 2025

(54) VIBRATION GENERATING DEVICE

(71) Applicant: ALPS ALPINE CO., LTD., Tokyo (JP)

(72) Inventors: Yuki Ikezoe, Miyagi (JP); Takahiro Umezu, Miyagi (JP); Takayuki Suizu, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 250 days.

(21) Appl. No.: 18/533,986

(22) Filed: Dec. 8, 2023

(65) Prior Publication Data

US 2024/0275253 A1 Aug. 15, 2024

(30) Foreign Application Priority Data

Feb. 10, 2023 (JP) .................................. 2023-019313

(51) Int. Cl.
*H02K 33/18* (2006.01)
*G08B 6/00* (2006.01)

(52) U.S. Cl.
CPC ............... *H02K 33/18* (2013.01); *G08B 6/00* (2013.01)

(58) Field of Classification Search
CPC .. H02K 7/1869; H02K 7/1876; H02K 7/1892; H02K 33/00; H02K 33/02; H02K 33/04; H02K 33/06; H02K 33/16; H02K 33/18; H02K 35/00; H02K 35/02; H02K 35/04; H02K 35/06; B06B 1/00; B06B 1/02; B06B 1/0215; B06B 1/0223; B06B 1/0269; B06B 1/0614; B06B 1/04; B06B 1/045; H02N 11/00; H02N 11/002; H02N 11/04

USPC ....................................................... 310/15–28
See application file for complete search history.

(56) References Cited

U.S. PATENT DOCUMENTS

| | | | | |
|---|---|---|---|---|
| 2,789,177 A | * | 4/1957 | Brockway .............. | H01H 50/76 335/93 |
| 3,400,316 A | * | 9/1968 | Kuschel ................. | H02K 33/02 327/461 |
| 3,501,745 A | * | 3/1970 | Beckman ............... | H01H 51/32 361/207 |
| 3,602,842 A | * | 8/1971 | Smith ...................... | G04C 3/10 318/128 |

(Continued)

*Primary Examiner* — Maged M Almawri
(74) *Attorney, Agent, or Firm* — IPUSA. PLLC

(57) ABSTRACT

A vibration generating device includes a stationary body including a bottom surface, a movable body disposed in an upper space of the bottom surface, and an elastic support disposed between the stationary and movable bodies and configured to support the movable body to be vibratable forward and backward to the stationary body. The elastic support includes a fixed portion fixed to the bottom surface, an upright portion extending upward from the fixed portion, an elastically deformable portion extending from the upright portion leftward and rightward, and a movable-body-attaching portion that extends from the elastically deformable portion and to which the movable body is attached. The elastic support includes a projection extending from the upright portion leftward and rightward at a position different from a position at which the elastically deformable portion extends from the upright portion leftward and rightward. A buffer is included between the projection and the stationary body.

5 Claims, 11 Drawing Sheets

(56) References Cited

U.S. PATENT DOCUMENTS

| | | | |
|---|---|---|---|
| 3,609,419 A * | 9/1971 | Greuter | G04B 17/045 968/126 |
| 4,154,559 A * | 5/1979 | Enomoto | F04B 45/047 417/413.1 |
| 4,555,682 A * | 11/1985 | Gounji | H03H 9/562 333/186 |
| 4,639,905 A * | 1/1987 | Goodloe | G01V 1/053 367/75 |
| 4,697,581 A * | 10/1987 | Endo | A61H 23/0218 601/78 |
| 5,111,697 A * | 5/1992 | Habermann | H02K 33/00 73/668 |
| 5,231,337 A * | 7/1993 | van Namen | H02K 33/18 318/128 |
| 5,397,955 A * | 3/1995 | Takagi | H02N 2/08 310/323.03 |
| 5,543,956 A * | 8/1996 | Nakagawa | G02B 26/085 359/872 |
| 6,057,554 A * | 5/2000 | Plesko | H03K 17/955 250/221 |
| 6,218,767 B1 * | 4/2001 | Akada | H02N 2/0085 310/323.02 |
| 6,323,568 B1 * | 11/2001 | Zabar | F04B 17/042 310/12.24 |
| 6,413,117 B1 * | 7/2002 | Annerino | H01R 12/7076 439/500 |
| 6,731,187 B2 * | 5/2004 | Kurihara | H03H 9/0514 333/192 |
| 7,193,346 B2 * | 3/2007 | Kim | H02K 7/061 310/81 |
| 7,382,510 B2 * | 6/2008 | Yoda | H02N 1/006 310/309 |
| 7,518,287 B2 * | 4/2009 | Hirasawa | H10N 30/2045 310/323.02 |
| 7,671,493 B2 * | 3/2010 | Takashima | G06F 3/016 310/15 |
| 7,999,421 B2 * | 8/2011 | Kim | H02K 33/18 310/15 |
| 8,269,379 B2 * | 9/2012 | Dong | H02K 33/16 310/28 |
| 8,278,786 B2 * | 10/2012 | Woo | H02K 33/16 310/15 |
| 8,288,898 B2 * | 10/2012 | Jun | H02K 33/16 310/34 |
| 8,368,268 B2 * | 2/2013 | Hasegawa | G02B 21/248 359/381 |
| 8,461,969 B2 * | 6/2013 | An | H02K 33/06 318/132 |
| 8,587,162 B2 * | 11/2013 | Kagami | A61C 17/32 310/38 |
| 8,624,449 B2 * | 1/2014 | Kim | H02K 33/16 310/28 |
| 8,624,450 B2 * | 1/2014 | Dong | H02K 33/16 310/20 |
| 8,643,229 B2 * | 2/2014 | Park | H02K 33/16 310/15 |
| 8,648,502 B2 * | 2/2014 | Park | H02K 33/16 310/15 |
| 8,829,741 B2 * | 9/2014 | Park | B06B 1/045 310/25 |
| 8,878,401 B2 * | 11/2014 | Lee | H02K 33/16 310/15 |
| 8,941,272 B2 * | 1/2015 | Hong | H02K 33/18 310/15 |
| D726,795 S * | 4/2015 | Huang | D15/147 |
| 9,024,489 B2 * | 5/2015 | Akanuma | H02K 33/16 310/15 |
| 9,225,265 B2 * | 12/2015 | Oh | G06F 3/016 |
| 9,252,648 B2 * | 2/2016 | Furukawa | H02K 7/1876 |
| 9,306,429 B2 * | 4/2016 | Akanuma | H02K 33/16 |
| 9,467,033 B2 * | 10/2016 | Jun | H02K 33/16 |
| 9,543,816 B2 * | 1/2017 | Nakamura | H02K 33/16 |
| 9,553,497 B2 * | 1/2017 | Kim | B06B 1/045 |
| 9,748,827 B2 * | 8/2017 | Dong | H02K 33/16 |
| 9,762,110 B2 * | 9/2017 | Wang | H02K 33/16 |
| 9,948,170 B2 * | 4/2018 | Jun | H02K 33/00 |
| 10,033,257 B2 * | 7/2018 | Zhang | H02K 33/12 |
| 10,063,128 B2 * | 8/2018 | Wang | H02K 33/16 |
| 10,160,010 B2 * | 12/2018 | Chun | H02K 33/16 |
| 10,307,791 B2 * | 6/2019 | Xu | B06B 1/045 |
| 10,328,461 B2 * | 6/2019 | Xu | B06B 1/045 |
| 10,447,133 B2 * | 10/2019 | Jin | H02K 33/18 |
| 10,483,451 B2 * | 11/2019 | Wang | H10N 30/01 |
| 10,486,196 B2 * | 11/2019 | Chai | B06B 1/045 |
| 10,491,090 B2 * | 11/2019 | Zu | H02K 33/16 |
| 10,547,233 B2 * | 1/2020 | Jin | H02K 5/04 |
| 10,596,594 B2 * | 3/2020 | Ling | H02K 33/02 |
| 10,596,596 B2 * | 3/2020 | Ling | H04R 9/066 |
| 10,674,278 B2 * | 6/2020 | Zhou | H04R 9/025 |
| 10,763,732 B2 * | 9/2020 | Liu | H02K 33/18 |
| 10,886,827 B2 * | 1/2021 | Liu | H02K 33/14 |
| 11,050,334 B2 * | 6/2021 | Mori | H02K 33/16 |
| 11,205,937 B2 * | 12/2021 | Song | H02K 41/0354 |
| 11,309,808 B1 * | 4/2022 | Li | H02K 35/02 |
| 11,522,429 B2 * | 12/2022 | Takahashi | H02K 33/06 |
| 11,949,308 B2 * | 4/2024 | Shao | H02K 33/02 |
| 11,984,784 B2 * | 5/2024 | Hatano | H02K 33/02 |
| 12,009,719 B2 * | 6/2024 | Maeda | B06B 1/045 |
| 2002/0109424 A1 * | 8/2002 | Iwabuchi | H04R 9/06 310/81 |
| 2003/0094861 A1 * | 5/2003 | Shimizu | H02K 33/10 310/36 |
| 2004/0169425 A1 * | 9/2004 | Aihara | B06B 1/045 310/15 |
| 2006/0066164 A1 * | 3/2006 | Kim | H02K 7/063 310/81 |
| 2006/0133218 A1 * | 6/2006 | Matthey | B06B 1/045 368/230 |
| 2009/0036807 A1 * | 2/2009 | Habatjou | A61H 23/0263 601/134 |
| 2009/0096299 A1 * | 4/2009 | Ota | B06B 1/045 310/25 |
| 2009/0243410 A1 * | 10/2009 | Kleibl | B06B 1/166 405/232 |
| 2009/0267423 A1 * | 10/2009 | Kajiwara | H02K 33/02 310/38 |
| 2010/0213773 A1 * | 8/2010 | Dong | H02K 33/16 310/25 |
| 2010/0289357 A1 * | 11/2010 | An | H02K 5/1677 310/81 |
| 2010/0302752 A1 * | 12/2010 | An | H02K 33/06 361/807 |
| 2011/0006618 A1 * | 1/2011 | Lee | H02K 33/16 310/25 |
| 2011/0018364 A1 * | 1/2011 | Kim | H02K 33/18 310/20 |
| 2011/0062803 A1 * | 3/2011 | Lee | H02K 33/18 310/29 |
| 2011/0068640 A1 * | 3/2011 | Choi | H02K 5/04 310/25 |
| 2011/0074229 A1 * | 3/2011 | Kim | H02K 15/14 310/29 |
| 2011/0089772 A1 * | 4/2011 | Dong | H02K 33/16 310/25 |
| 2011/0101797 A1 * | 5/2011 | Lee | H02K 33/16 310/29 |
| 2011/0101798 A1 * | 5/2011 | Lee | H02K 33/16 310/29 |
| 2011/0115310 A1 * | 5/2011 | Dong | H02K 33/16 310/28 |
| 2011/0115311 A1 * | 5/2011 | Dong | H02K 33/16 310/28 |
| 2011/0133577 A1 * | 6/2011 | Lee | H02K 33/18 310/15 |
| 2011/0156500 A1 * | 6/2011 | Dong | H02K 33/16 310/25 |
| 2011/0198945 A1 * | 8/2011 | Nakagawa | H02K 33/16 310/12.25 |

(56) References Cited

U.S. PATENT DOCUMENTS

| | | | |
|---|---|---|---|
| 2011/0203061 A1* | 8/2011 | Takahashi | H02K 33/18 310/38 |
| 2011/0241451 A1* | 10/2011 | Park | H02K 33/16 310/25 |
| 2011/0254782 A1* | 10/2011 | Park | H02K 33/04 345/173 |
| 2011/0266892 A1* | 11/2011 | Wauke | H02K 33/18 310/25 |
| 2011/0278960 A1* | 11/2011 | Jeon | B06B 1/045 310/25 |
| 2011/0316361 A1* | 12/2011 | Park | H02K 33/16 310/25 |
| 2012/0032535 A1* | 2/2012 | Park | H02K 35/02 310/25 |
| 2012/0049660 A1* | 3/2012 | Park | B06B 1/045 310/25 |
| 2012/0104875 A1* | 5/2012 | Park | H02K 33/16 310/25 |
| 2012/0108299 A1* | 5/2012 | Yang | H02K 33/16 455/567 |
| 2012/0153748 A1* | 6/2012 | Wauke | H02K 33/16 310/25 |
| 2012/0169148 A1* | 7/2012 | Kim | H02K 33/16 310/25 |
| 2012/0170792 A1* | 7/2012 | Li | H04R 9/066 381/412 |
| 2012/0187780 A1* | 7/2012 | Bang | H02K 33/16 310/25 |
| 2012/0313459 A1* | 12/2012 | Zhang | H02K 33/18 310/25 |
| 2012/0319506 A1* | 12/2012 | Shim | H02K 33/16 310/25 |
| 2013/0061736 A1* | 3/2013 | Wauke | G10H 1/42 84/736 |
| 2013/0099600 A1* | 4/2013 | Park | B06B 1/045 310/15 |
| 2013/0099602 A1* | 4/2013 | Park | H02K 33/16 310/25 |
| 2013/0119787 A1* | 5/2013 | Yu | H02K 33/16 310/25 |
| 2013/0134804 A1* | 5/2013 | Kim | B06B 1/045 310/25 |
| 2013/0169072 A1* | 7/2013 | Oh | H02K 33/16 310/36 |
| 2013/0229070 A1* | 9/2013 | Akanuma | H02K 33/00 310/25 |
| 2014/0035397 A1* | 2/2014 | Endo | H02K 33/18 310/30 |
| 2014/0062224 A1* | 3/2014 | Kim | H02K 33/16 310/15 |
| 2014/0152126 A1* | 6/2014 | Kim | B06B 1/045 310/25 |
| 2014/0152148 A1* | 6/2014 | Oh | B06B 3/00 310/321 |
| 2014/0306556 A1* | 10/2014 | Kim | H02K 33/16 310/25 |
| 2015/0015117 A1* | 1/2015 | Lee | B06B 1/04 310/20 |
| 2015/0123498 A1* | 5/2015 | Yang | H02K 33/16 310/25 |
| 2015/0137627 A1* | 5/2015 | Katada | H02K 33/16 310/25 |
| 2015/0137628 A1* | 5/2015 | Endo | H02K 33/16 310/25 |
| 2015/0194870 A1* | 7/2015 | Kim | H02K 33/18 310/25 |
| 2015/0328664 A1* | 11/2015 | Kim | B06B 1/0644 310/323.01 |
| 2016/0164389 A1* | 6/2016 | Jang | H02K 7/116 310/20 |
| 2016/0173990 A1* | 6/2016 | Park | H04R 9/043 381/354 |
| 2016/0192075 A1* | 6/2016 | Shibata | H04R 1/28 310/28 |
| 2016/0198262 A1* | 7/2016 | Wang | H04R 7/18 381/392 |
| 2016/0218607 A1* | 7/2016 | Oh | H02K 33/16 |
| 2016/0254736 A1* | 9/2016 | Jin | H02K 33/16 310/25 |
| 2016/0381462 A1* | 12/2016 | Wang | H04R 7/18 381/400 |
| 2017/0019011 A1* | 1/2017 | Wang | H02K 33/16 |
| 2017/0033653 A1* | 2/2017 | Wang | H02K 33/16 |
| 2017/0033657 A1* | 2/2017 | Mao | H02K 33/16 |
| 2017/0033669 A1* | 2/2017 | Xu | H02K 33/16 |
| 2017/0104401 A1* | 4/2017 | Umehara | H02K 33/16 |
| 2017/0110920 A1* | 4/2017 | Mao | H02K 1/34 |
| 2017/0214306 A1* | 7/2017 | Katada | H02K 33/16 |
| 2017/0250596 A1* | 8/2017 | Son | H02K 7/08 |
| 2017/0288519 A1* | 10/2017 | Kim | H02K 33/16 |
| 2018/0021812 A1* | 1/2018 | Akanuma | H02K 33/00 310/25 |
| 2018/0241295 A1* | 8/2018 | Zu | H02K 33/14 |
| 2018/0250107 A1* | 9/2018 | Dai | H02K 1/2791 |
| 2018/0297074 A1* | 10/2018 | Huang | B06B 1/045 |
| 2019/0044425 A1* | 2/2019 | Zu | H02K 33/02 |
| 2019/0151895 A1* | 5/2019 | Takahashi | B06B 1/045 |
| 2019/0206601 A1* | 7/2019 | Wauke | H01F 7/0289 |
| 2020/0136488 A1* | 4/2020 | Takahashi | H02K 33/16 |
| 2020/0366177 A1* | 11/2020 | Maeda | H02K 33/02 |
| 2021/0067021 A1* | 3/2021 | Maeda | H02K 33/16 |
| 2021/0194342 A1* | 6/2021 | Kitahara | H02K 33/18 |
| 2022/0123645 A1* | 4/2022 | Ohishi | H02K 35/02 |
| 2022/0209636 A1* | 6/2022 | Shao | H02K 33/02 |
| 2023/0198366 A1* | 6/2023 | Tsuchihashi | H02K 33/18 310/28 |

* cited by examiner

VIBRATION GENERATING DEVICE

CROSS-REFERENCE TO RELATED APPLICATIONS

The present application is based on and claims priority to Japanese Patent Application No. 2023-019313 filed on Feb. 10, 2023, the entire contents of which are hereby incorporated by reference.

BACKGROUND

1. Field of the Invention

The present disclosure relates to vibration generating devices.

2. Description of the Related Art

In portable information terminals (e.g., smartphones, portable phones, tablet terminals, and the like), gaming machines, and electronic devices such as information display devices and the like mounted in vehicles such as automobiles and the like, vibration generating devices configured to generate a vibration that can be felt by users to notify the users of various incoming notifications, for example, incoming calls, incoming mails, and incoming messages from SNS, or to provide feedback to users' operations have been used.

As such vibration generating devices, for example, US Patent Application Publication No. 2006/133218 discloses a vibrating device to be attached to a portable object, such as a wristwatch. In the vibrating device disclosed in this US publication, a moving mass is vibrated in a predetermined vibration direction (leftward-rightward direction) by alternatingly supplying electrical signals at a predetermined frequency to a coil.

SUMMARY

A vibration generating device according to one embodiment includes a stationary body including a bottom surface, a movable body disposed in an upper space of the bottom surface, and an elastic support. The elastic support is disposed between the stationary body and the movable body and is configured to support the movable body so as to be vibratable in a forward-backward direction with respect to the stationary body. The elastic support includes a fixed portion fixed to the bottom surface, an upright portion extending upward from the fixed portion, an elastically deformable portion extending from the upright portion in a leftward-rightward direction, and a movable body-attaching portion that extends from the elastically deformable portion and to which the movable body is attached. The elastic support includes a projection extending from the upright portion in the leftward-rightward direction at a position in the upright portion, the position being different from a position in the upright portion at which the elastically deformable portion extends from the upright portion in the leftward-rightward direction. A buffer is included between the projection and the stationary body.

DESCRIPTION OF EMBODIMENTS

The technique disclosed in US Patent Application Publication No. 2006/133218 was devised to cause a vibration in a leftward-rightward direction, i.e., a transverse direction of the vibrating device, by the action of a main vibration having a predetermined frequency. However, the vibrating device in this US publication vibrates in an unintended upward-downward direction, i.e., a thickness direction of the vibrating device, by the action of what is called a sub resonance, which is a resonance occurring at a frequency other than a predetermined frequency.

Hereinafter, one embodiment of the present disclosure will be described with reference to the drawings.
Configuration of a Vibration Generating Device 10

Figure 1:
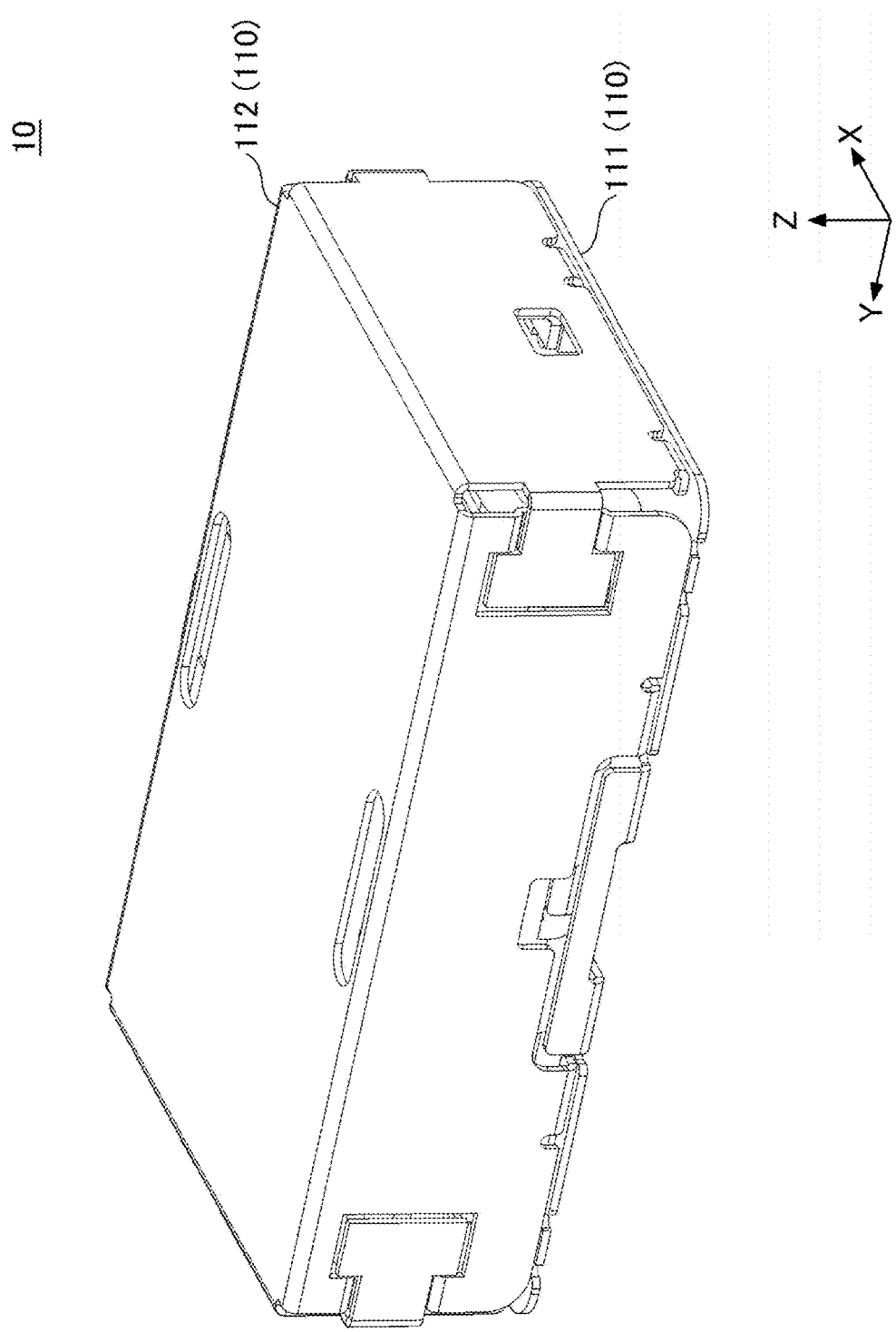
FIG. 1 is a perspective view of an outer appearance of a vibration generating device according to one embodiment.
Figure 2:
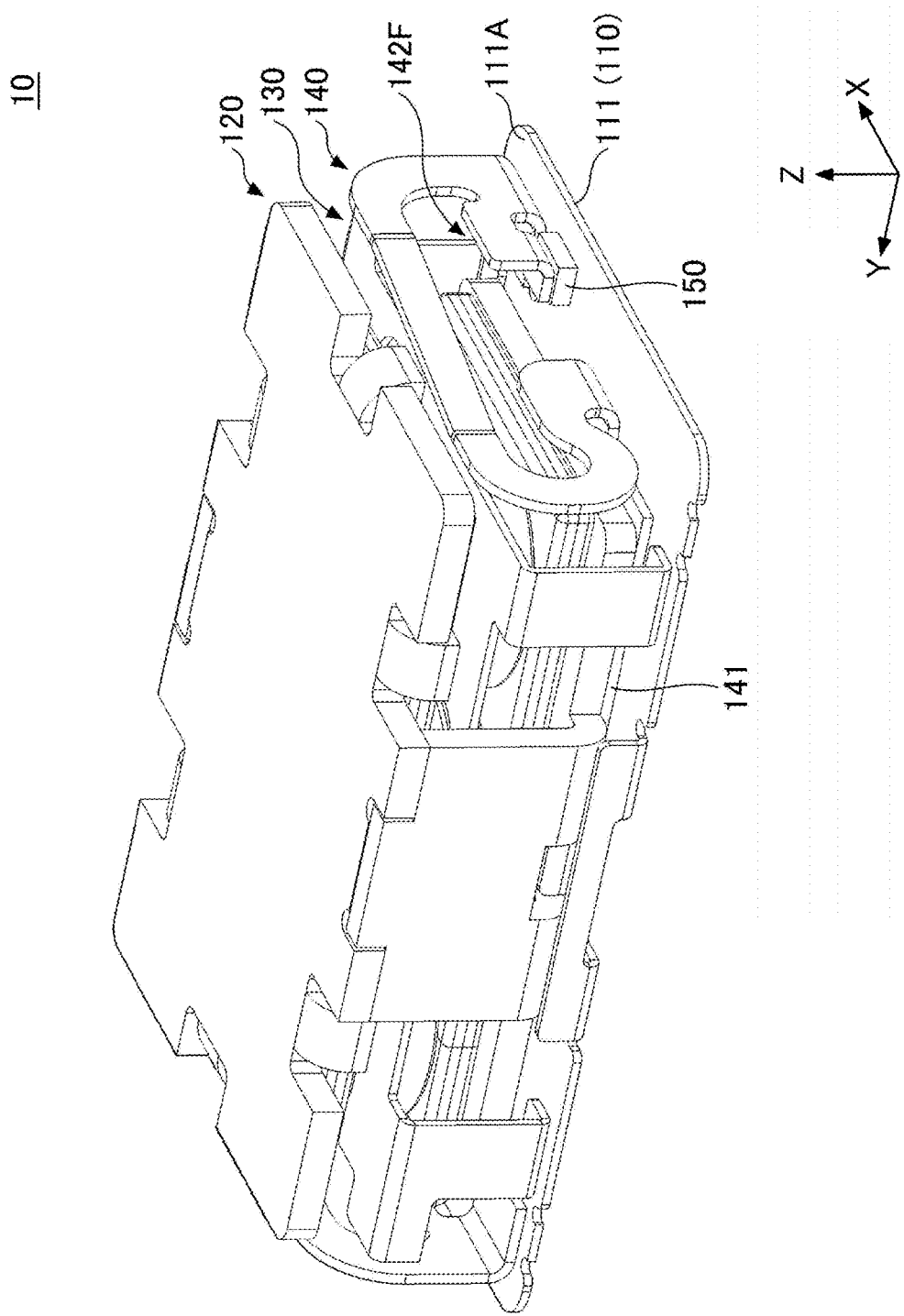
FIG. 2 is a perspective view of the outer appearance of the vibration generating device according to one embodiment, with an upper casing being removed.
Figure 3:
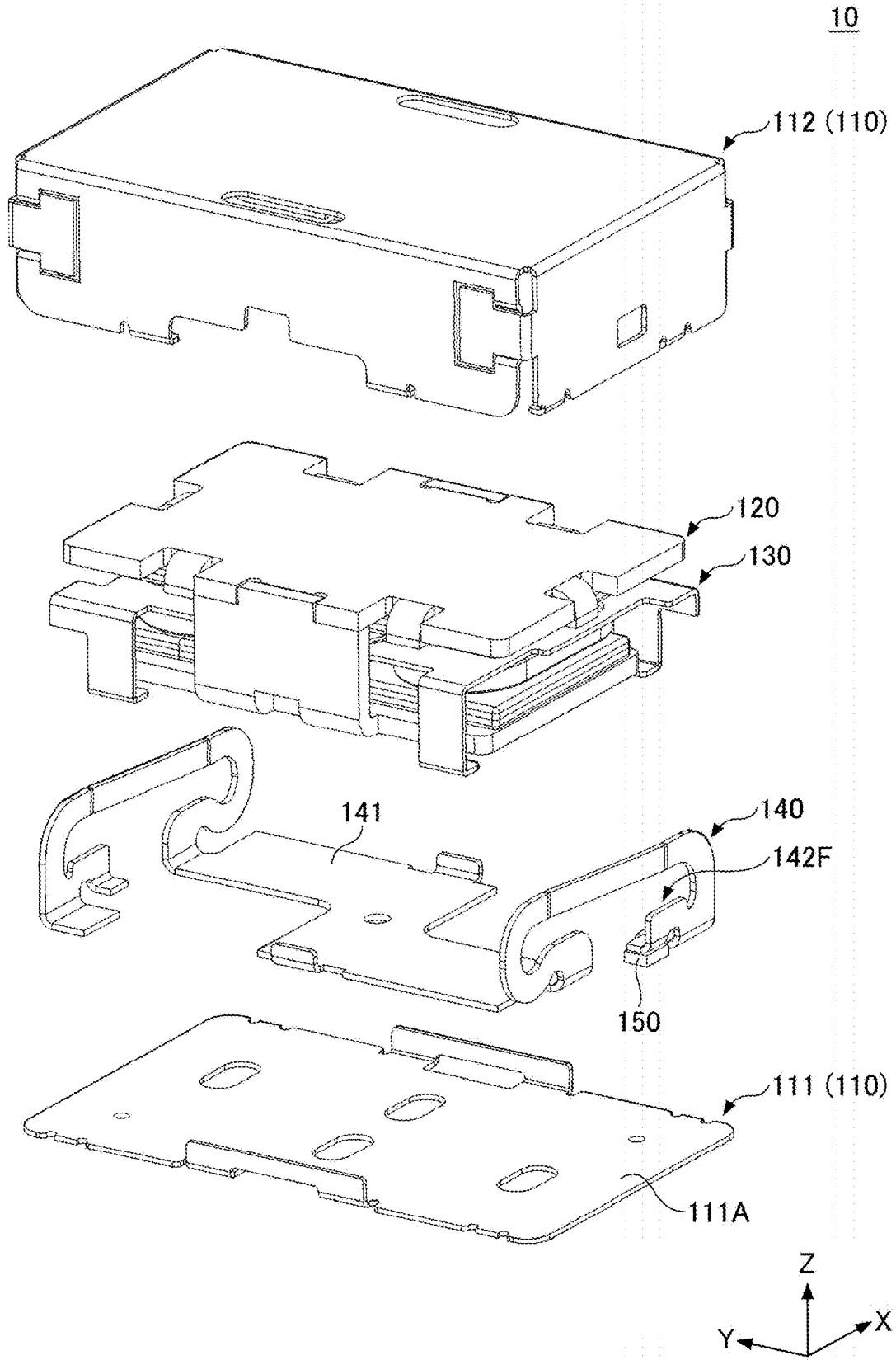
FIG. 3 is an exploded perspective view of the vibration generating device according to one embodiment.

FIG. 1 is a perspective view of the outer appearance of the vibration generating device 10 according to one embodiment. FIG. 2 is a perspective view of the outer appearance of the vibration generating device 10 according to one embodiment, with an upper casing 112 being removed. FIG. 3 is an exploded perspective view of the vibration generating device 10 according to one embodiment.

Note in the following description that, for the sake of convenience, a Z-axis direction in the drawings is defined as an upward-downward direction, an X-axis direction in the drawings is defined as a leftward-rightward direction, and a Y-axis direction in the drawings is defined as a forward-backward direction. Here, a positive Z-axis direction is defined as an upward direction, a positive X-axis direction is defined as a rightward direction, and a positive Y-axis direction is defined as a forward direction.

The vibration generating device 10 as illustrated in FIG. 1 to FIG. 3 is a device that is mounted in, for example, portable information terminals (e.g., smartphones, portable phones, tablet terminals, and the like), gaming machines, and electronic devices such as information display devices and the like mounted in vehicles such as automobiles and the like. The vibration generating device 10 is used for generating a vibration or the like that can be felt by users to notify the users of various incoming notifications, for example, incoming calls, incoming mails, and incoming messages from SNS, or to provide feedback to users' operations.

The vibration generating device 10 is formed so as to be compact and thin for saving on space in an electronic device in which the vibration generating device 10 is to be mounted. The vibration generating device 10 is configured to vibrate in the forward-backward direction (Y-axis direction) by a vibrator 120 provided in an interior of a casing 110 being driven by an alternating driving current having a predetermined frequency.

As illustrated in FIG. 1 to FIG. 3, the vibration generating device 10 includes the casing 110, the vibrator 120, a coil assembly 130, an elastic support 140, and a buffer 150.

The casing 110 is formed by machining a metal plate and is a box-shaped member having an approximately thin rectangular parallelepiped. The casing 110 includes a lower casing 111 and the upper casing 112 that are separable from each other. The upper casing 112 is a container (approximately thin rectangular parallelepiped)-shaped member that is open at the bottom thereof. Various components (the vibrator 120 and the elastic support 140) are included in an interior of the upper casing 112. The lower casing 111 is a horizontal, flat plate-shaped member, and is attached to a bottom opening of the upper casing 112, thereby covering the bottom opening of the upper casing 112. Note that, the casing 110 is one example of the "stationary body". Also, the lower casing 111 is one example of the "bottom surface of the stationary body".

The vibrator 120 is one example of the "movable body disposed in the upper space of the bottom surface". The vibrator 120 is disposed in the upper (positive Z-axis side) space of the lower casing 111, i.e., the interior of the upper casing 112. The vibrator 120 is vibrated in the forward-backward direction (Y-axis direction) by the action of reaction of an electromagnetic force generated by the coil assembly 130. Note that, detailed configurations and movements of the vibrator 120 will be described below with reference to FIG. 4 to FIG. 6.

The coil assembly 130 is disposed, together with the vibrator 120, in the upper (positive Z-axis side) space of the lower casing 111, i.e., the interior of the upper casing 112. The coil assembly 130 is driven by an alternating driving current having a predetermined frequency, thereby generating the electromagnetic force. By the action of the reaction of the electromagnetic force, the vibrator 120 is vibrated in the forward-backward direction (Y-axis direction). Note that, detailed configurations and movements of the coil assembly 130 will be described below with reference to FIG. 4 to FIG. 6.

The elastic support 140 is formed by machining a metal plate, and is located between the casing 110 (stationary body) and the vibrator 120 (movable body) and supports the vibrator 120 so as to be vibratable in the forward-backward direction (Y-axis direction) with respect to the casing 110. Specifically, the elastic support 140 includes a horizontal, flat plate-shaped movable body-attaching portion 141, and when the vibrator 120 is attached above the movable body-attaching portion 141, the elastic support 140 supports the vibrator 120 so as to be vibratable in the forward-backward direction (Y-axis direction) with respect to the casing 110. Note that, detailed configurations of the elastic support 140 will be described below with reference to FIG. 7 to FIG. 10.

The buffer 150 is provided between a projection 142F included in the elastic support 140 and an upper surface 111A of the lower casing 111. The buffer 150 is provided for suppressing the vibrator 120 from vibrating in an unintended upward-downward direction.

The thus-configured vibration generating device 10 can vibrate the vibrator 120 retained by the elastic support 140 in the forward-backward direction (Y-axis direction) while elastically deforming the elastic support 140 by an alternating driving current supplied to the coil assembly 130 from an unillustrated external circuit via an unillustrated FPC.

Configurations of the Vibrator 120 and the Coil Assembly 130

Figure 4:
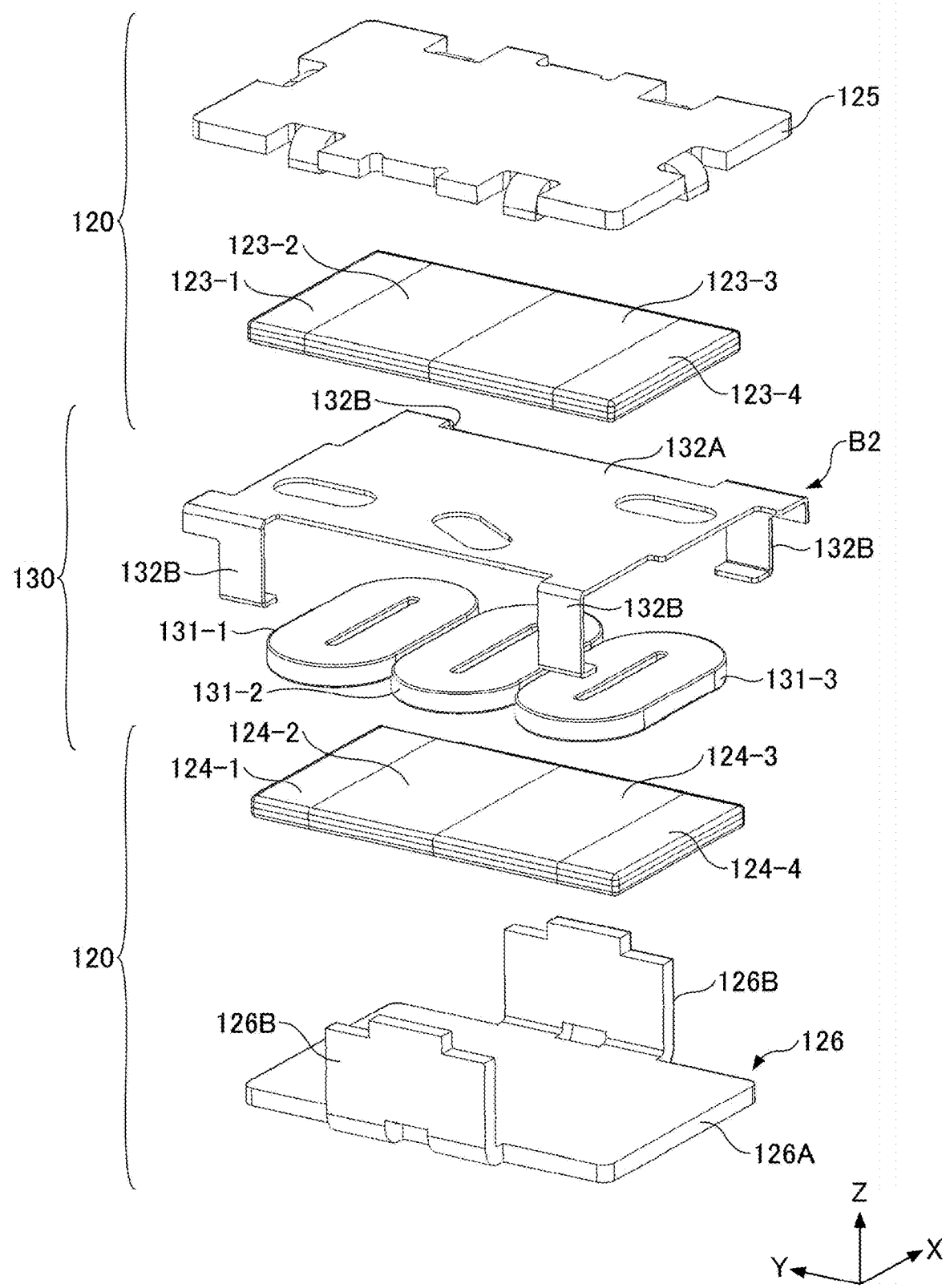
FIG. 4 is an exploded perspective view of a vibrator and a coil assembly according to one embodiment.
Figure 5:
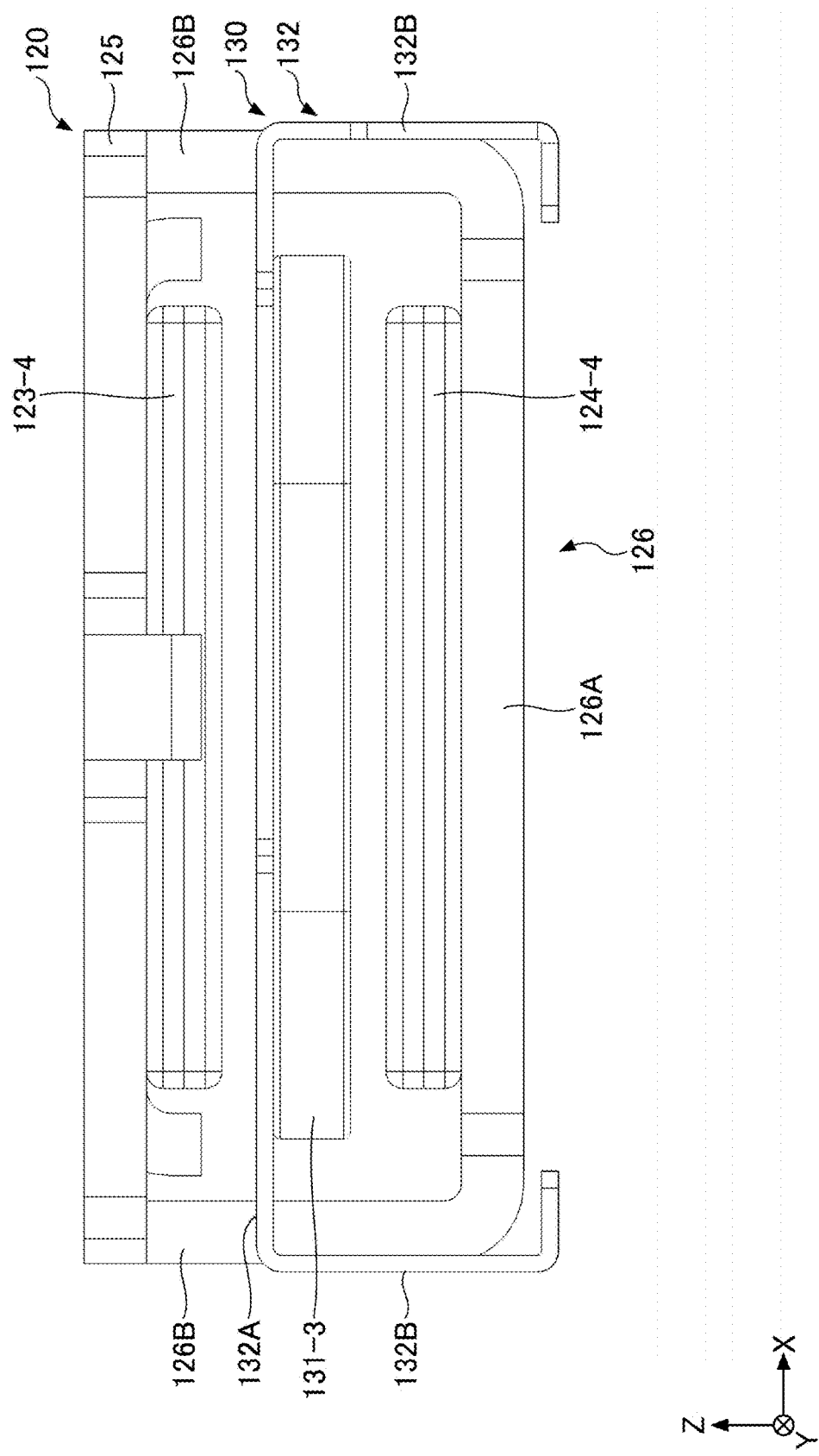
FIG. 5 is a rear side view of the vibrator and the coil assembly according to one embodiment.
Figure 6:
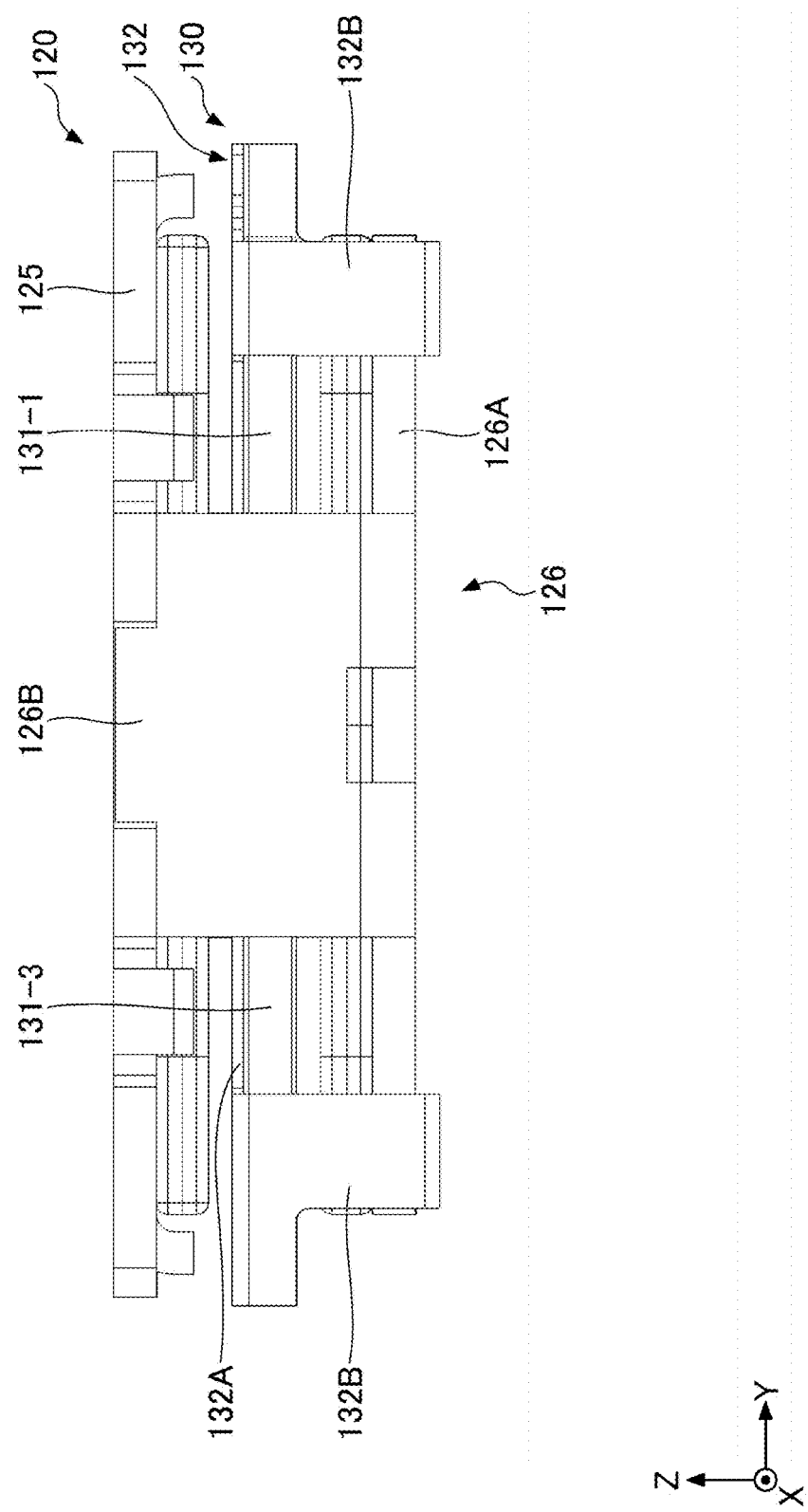
FIG. 6 is a right side view of the vibrator and the coil assembly according to one embodiment.

FIG. 4 is an exploded perspective view of the vibrator 120 and the coil assembly 130 according to one embodiment. FIG. 5 is a rear side view of the vibrator 120 and the coil assembly 130 according to one embodiment. FIG. 6 is a right side view of the vibrator 120 and the coil assembly 130 according to one embodiment.

As illustrated in FIG. 4, the coil assembly 130 includes three coils 131-1, 131-2, and 131-3, and a coil holder 132.

The three coils 131-1, 131-2, and 131-3 are arranged side-by-side in the forward-backward direction (Y-axis direction). Each of the three coils 131-1, 131-2, and 131-3 has, as viewed from above (positive Z-axis direction), an oblong ring shape in which the leftward-rightward direction (X-axis direction) is a longitudinal direction thereof. Each coil is formed of an electric wire (e.g., a copper wire covered with an insulator) that is multiply wound such that each coil has the oblong ring shape. Also, the thickness of the three coils 131-1, 131-2, and 131-3 in the upward-downward direction (Z-axis direction) is relatively small.

Note that, in a plan view from above, the three coils 131-1, 131-2, and 131-3 are each provided below and across two magnets next to each other in the forward-backward direction (Y-axis direction) among the below-described four upper magnets 123-1, 123-2, 123-3, and 123-4.

Also, in the plan view from above, the three coils 131-1, 131-2, and 131-3 are each provided above and across two magnets next to each other in the forward-backward direction (Y-axis direction) among the below-described four lower magnets 124-1, 124-2, 124-3, and 124-4.

The coil holder 132 is formed by machining a metal plate, and is a member configured to retain the three coils 131-1, 131-2, and 131-3 at predetermined positions. Specifically, the coil holder 132 includes a coil-retaining portion 132A and four leg portions 132B.

The coil-retaining portion 132A is a horizontal, flat plate-shaped portion having an approximately rectangular shape as viewed from above. The coil-retaining portion 132A retains the three coils 131-1, 131-2, and 131-3 at the lower surface of the coil-retaining portion 132A.

The four leg portions 132B are provided approximately at the four corners of the coil-retaining portion 132A, and are vertical wall portions that are provided downward (negative Z-axis direction) from the coil-retaining portion 132A.

The lower-end portion of each of the four leg portions 132B is bent at the right angle, and the four leg portions 132B are each fixed to the upper surface 111A of the lower casing 111 at the lower-end portion thereof. Thereby, the four leg portions 132B support the coil-retaining portion 132A so that the coil-retaining portion 132A is at a predetermined height position with respect to the lower casing 111.

Meanwhile, as illustrated in FIG. 4 to FIG. 6, the vibrator 120 includes the four upper magnets 123-1, 123-2, 123-3, and 123-4, the four lower magnets 124-1, 124-2, 124-3, and 124-4, an upper yoke 125, and a lower yoke 126.

Above (positive Z-axis direction) the three coils 131-1, 131-2, and 131-3, the four upper magnets 123-1, 123-2, 123-3, and 123-4 are provided so as to be apart from the three coils 131-1, 131-2, and 131-3 by a predetermined distance and are arranged side-by-side in the forward-backward direction (Y-axis direction).

Each of the four upper magnets 123-1, 123-2, 123-3, and 123-4 is a flat plate-shaped permanent magnet having a rectangular shape in which the leftward-rightward direction (X-axis direction) is a longitudinal direction thereof as viewed from above (positive Z-axis direction).

The upper half of each of the four upper magnets 123-1, 123-2, 123-3, and 123-4 is magnetized to one pole of the N pole and the S pole, and the lower half thereof is magnetized to the other pole of the N pole and the S pole. However, among the four upper magnets 123-1, 123-2, 123-3, and 123-4, two upper magnets next to each other are magnetized to different poles in both of the upper half and the lower half.

Below (negative Z-axis direction) the three coils 131-1, 131-2, and 131-3, the four lower magnets 124-1, 124-2, 124-3, and 124-4 are provided so as to be apart from the three coils 131-1, 131-2, and 131-3 by a predetermined distance and are arranged side-by-side in the forward-backward direction (Y-axis direction).

Each of the four lower magnets 124-1, 124-2, 124-3, and 124-4 is a flat plate-shaped permanent magnet having a rectangular shape in which the leftward-rightward direction (X-axis direction) is a longitudinal direction thereof as viewed from above (positive Z-axis direction).

The upper half of each of the four lower magnets 124-1, 124-2, 124-3, and 124-4 is magnetized to one pole of the N pole and the S pole, and the lower half thereof is magnetized to the other pole of the N pole and the S pole. However, among the four lower magnets 124-1, 124-2, 124-3, and 124-4, two lower magnets next to each other are magnetized to different poles in both of the upper half and the lower half.

Moreover, the upper halves of the four lower magnets 124-1, 124-2, 124-3, and 124-4 and the lower halves of the four upper magnets 123-1, 123-2, 123-3, and 123-4 respectively face each other and are magnetized to different poles.

For example, when the lower halves of the four upper magnets 123-1, 123-2, 123-3, and 123-4 are sequentially magnetized to the N pole, the S pole, the N pole, and the S pole, the upper halves of the four lower magnets 124-1, 124-2, 124-3, and 124-4 are sequentially magnetized to the S pole, the N pole, the S pole, and the N pole.

The upper yoke 125 and the lower yoke 126 are formed of a magnetic material (e.g., pure iron, low-carbon steel, or the like).

The upper yoke 125 is provided above the four upper magnets 123-1, 123-2, 123-3, and 123-4, and is a flat plate-shaped member having an approximately rectangular shape in a plan view from above. The lower surface of the upper yoke 125 is closely attached to the upper surfaces of the four upper magnets 123-1, 123-2, 123-3, and 123-4. The upper yoke 125 retains the four upper magnets 123-1, 123-2, 123-3, and 123-4 and amplifies the magnetic attractive force of the four upper magnets 123-1, 123-2, 123-3, and 123-4.

The lower yoke 126 is provided below the four lower magnets 124-1, 124-2, 124-3, and 124-4. The lower yoke 126 includes a bottom plate 126A and two wall portions 126B.

The bottom plate portion 126A is a flat plate-shaped portion having an approximately rectangular shape as viewed from above. The upper surface of the bottom plate portion 126A is closely attached to the lower surfaces of the four lower magnets 124-1, 124-2, 124-3, and 124-4. The lower yoke 126 retains the four lower magnets 124-1, 124-2, 124-3, and 124-4 and amplifies the magnetic attractive force of the four lower magnets 124-1, 124-2, 124-3, and 124-4.

The two wall portions 126B are provided at both of the leftward and rightward end portions of the bottom plate portion 126A. The two wall portions 126B are wall portions that vertically extend from the end portions of the bottom plate portion 126A. Note that, each of the two wall portions 126B is provided at the end portion of the bottom plate portion 126A in a center portion thereof in the forward-backward direction (Y-axis direction) and have a certain width in the forward-backward direction (Y-axis direction).

When both of the leftward and rightward end portions of the upper yoke 125 are attached to the upper end portions of the two wall portions 126B, the lower yoke 126 retains the upper yoke 125 at a predetermined height position. Thereby, a space is formed between the bottom plate portion 126A of the lower yoke 126, and the upper yoke 125. In this space, the four upper magnets 123-1, 123-2, 123-3, and 123-4, the coil assembly 130, and the four lower magnets 124-1, 124-2, 124-3, and 124-4 can be disposed.

Movements of the Vibrator 120 and the Coil Assembly 130

In the above-configured coil assembly 130, by causing a driving current of a first direction to flow through the three coils 131-1, 131-2, and 131-3, a forward (positive Y-axis direction) force (electromagnetic force) is applied to the three coils 131-1, 131-2, and 131-3 in accordance with the Fleming's left-hand rule.

Conversely, in the coil assembly 130, by causing a driving current of a second direction, which is a direction opposite to the first direction, to flow through the three coils 131-1, 131-2, and 131-3, a backward (negative Y-axis direction) force (electromagnetic force) is applied to the three coils 131-1, 131-2, and 131-3 in accordance with the Fleming's left-hand rule.

Therefore, in the coil assembly 130, by supplying an alternating driving current to the three coils 131-1, 131-2, and 131-3, the forward (positive Y-axis direction) force (electromagnetic force) and the backward (negative Y-axis direction) force (electromagnetic force) are alternatingly applied to the three coils 131-1, 131-2, and 131-3.

At this time, based on a relationship between action and reaction, forces of directions opposite to the directions of the forces applied to the three coils 131-1, 131-2, and 131-3 are alternatingly applied to the four upper magnets 123-1, 123-2, 123-3, and 123-4 and the four lower magnets 124-1, 124-2, 124-3, and 124-4.

Therefore, by supplying an alternating driving current having the same frequency as a resonance frequency f1 of the vibrator 120 to the three coils 131-1, 131-2, and 131-3, the vibrator 120 is resonated and can vibrate in the forward-backward direction (Y-axis direction).

Especially, by arranging the three coils 131-1, 131-2, and 131-3 side-by-side in the forward-backward direction (Y-axis direction), the vibrator 120 can vibrate more intensively in the forward-backward direction (Y-axis direction) than a configuration in which two or less coils are provided.

However, for the vibrator 120, two or less coils may be provided or four or more coils may be provided.

Configuration of the Elastic Support 140

Figure 7:
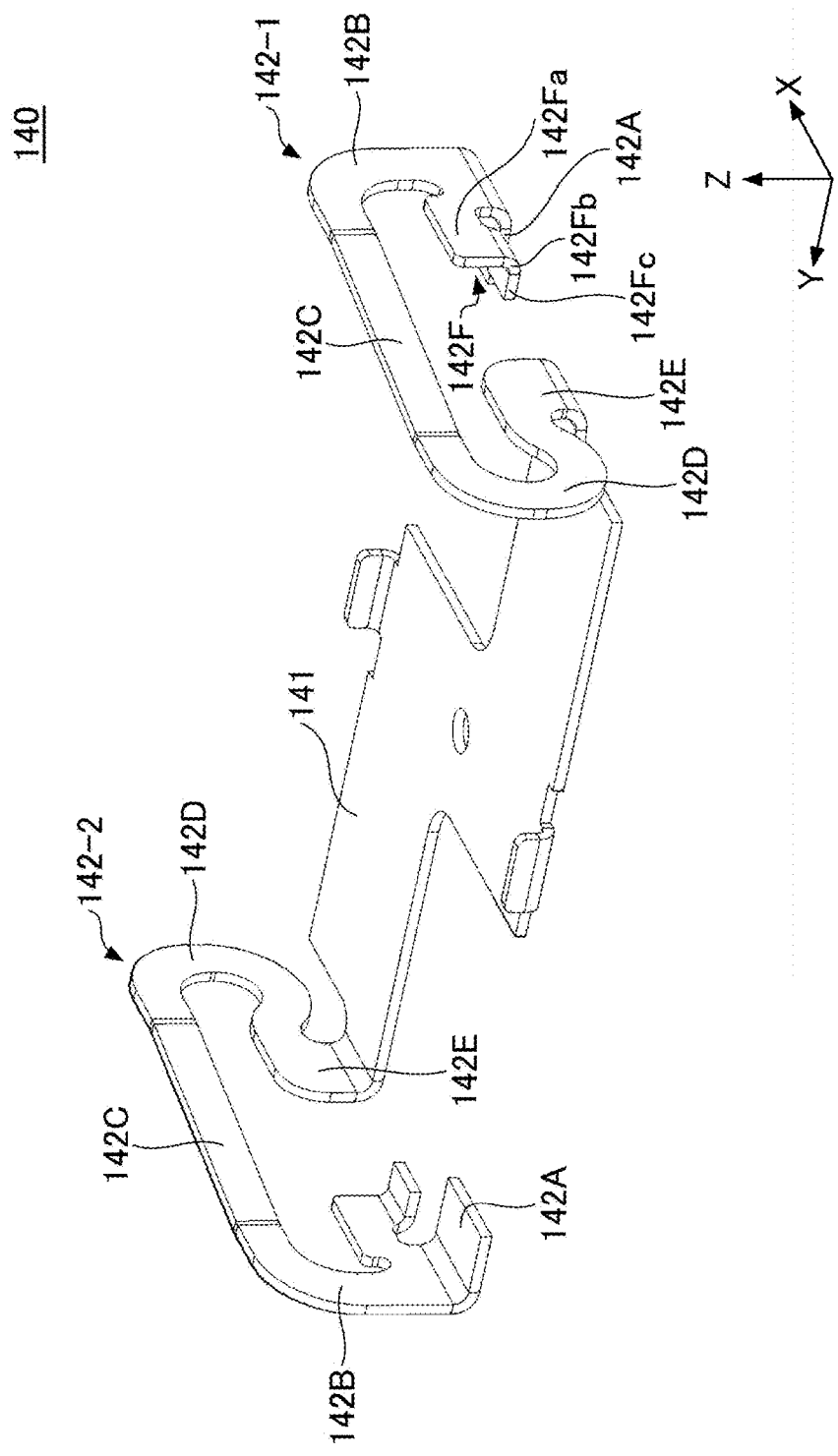
FIG. 7 is a perspective view of an outer appearance of an elastic support according to one embodiment.
Figure 8:
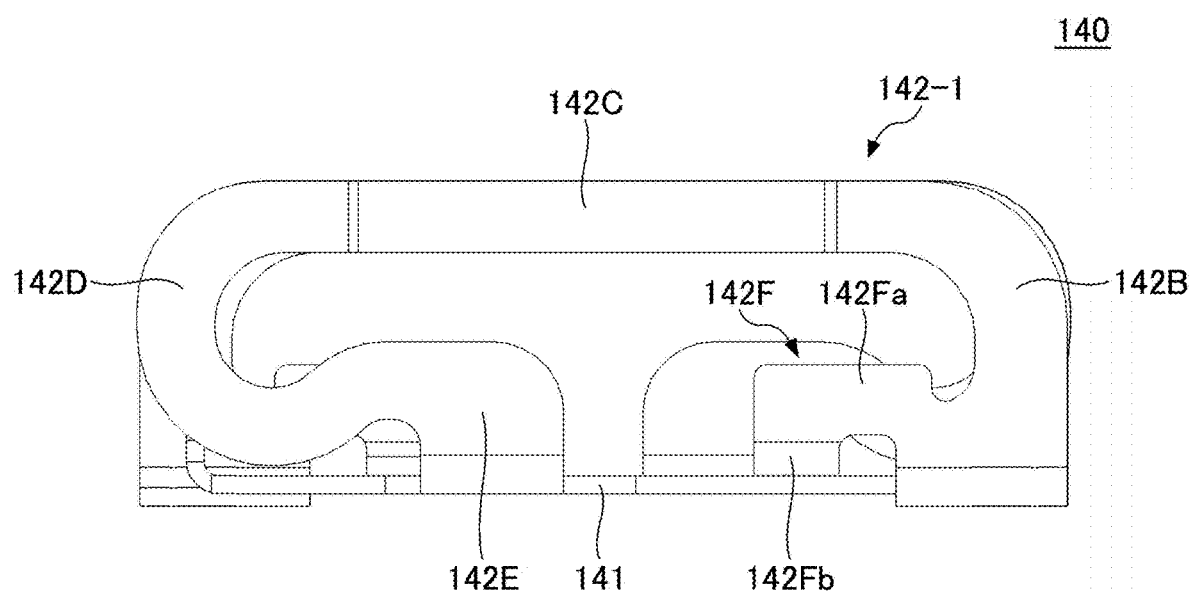
FIG. 8 is a rear side view of the elastic support according to one embodiment.

FIG. 7 is a perspective view of the outer appearance of the elastic support 140 according to one embodiment. FIG. 8 is a rear side view of the elastic support 140 according to one embodiment.

As illustrated in FIG. 7 and FIG. 8, the elastic support 140 includes: the horizontal, flat plate-shaped movable body-attaching portion 141 to which the vibrator 120 is to be attached; an elastic arm 142-1 extending from a back-end portion (end portion on the negative Y-axis side) of the movable body-attaching portion 141; and an elastic arm 142-2 extending from a front-end portion (end portion on the positive Y-axis side) of the movable body-attaching portion 141.

As illustrated in FIG. 7 and FIG. 8, the elastic arm 142-1 of the elastic support 140 includes a fixed portion 142A, an upright portion 142B, an elastically deformable portion 142C, a turned-back portion 142D, and a connecting portion 142E.

The fixed portion 142A is provided at a tip of the elastic arm 142-1 (right-end portion (end portion on the positive X-axis side) and lower-end portion (end portion on the negative Z-axis side)) and is a horizontal portion fixed to the lower casing 111 (one example of the "bottom surface of the stationary body").

The upright portion 142B is a vertical portion extending upward (positive Z-axis direction) from the fixed portion 142A.

The elastically deformable portion 142C is a vertical portion extending from an upper-end portion of the upright portion 142B leftward (negative X-axis direction) in the form of a straight line.

The turned-back portion 142D extends leftward (negative X-axis direction) from a left-end portion (end portion on the negative X-axis side) of the elastically deformable portion 142C, and then is turned back so as to extend rightward (positive X-axis direction). The turned-back portion 142D is a portion that is vertical and has a curved (C shape) portion as viewed backward.

The connecting portion 142E is a vertical portion that connects the end portion of the turned-back portion 142D to the back-end portion (end portion on the negative Y-axis side) of the movable body-attaching portion 141.

Note that, the elastic support 140 has a shape of a point symmetry. Therefore, the elastic arm 142-2 has the same shape as the shape of the elastic arm 142-1 except that the elastic arm 142-2 is provided with the left and right sides reversed relative to the elastic arm 142-1. Thus, the components of the elastic arm 142-2 are given the same reference numerals or symbols as in the elastic arm 142-1, and description thereof will be omitted.

Fixing Method of the Elastic Support 140

Figure 9:
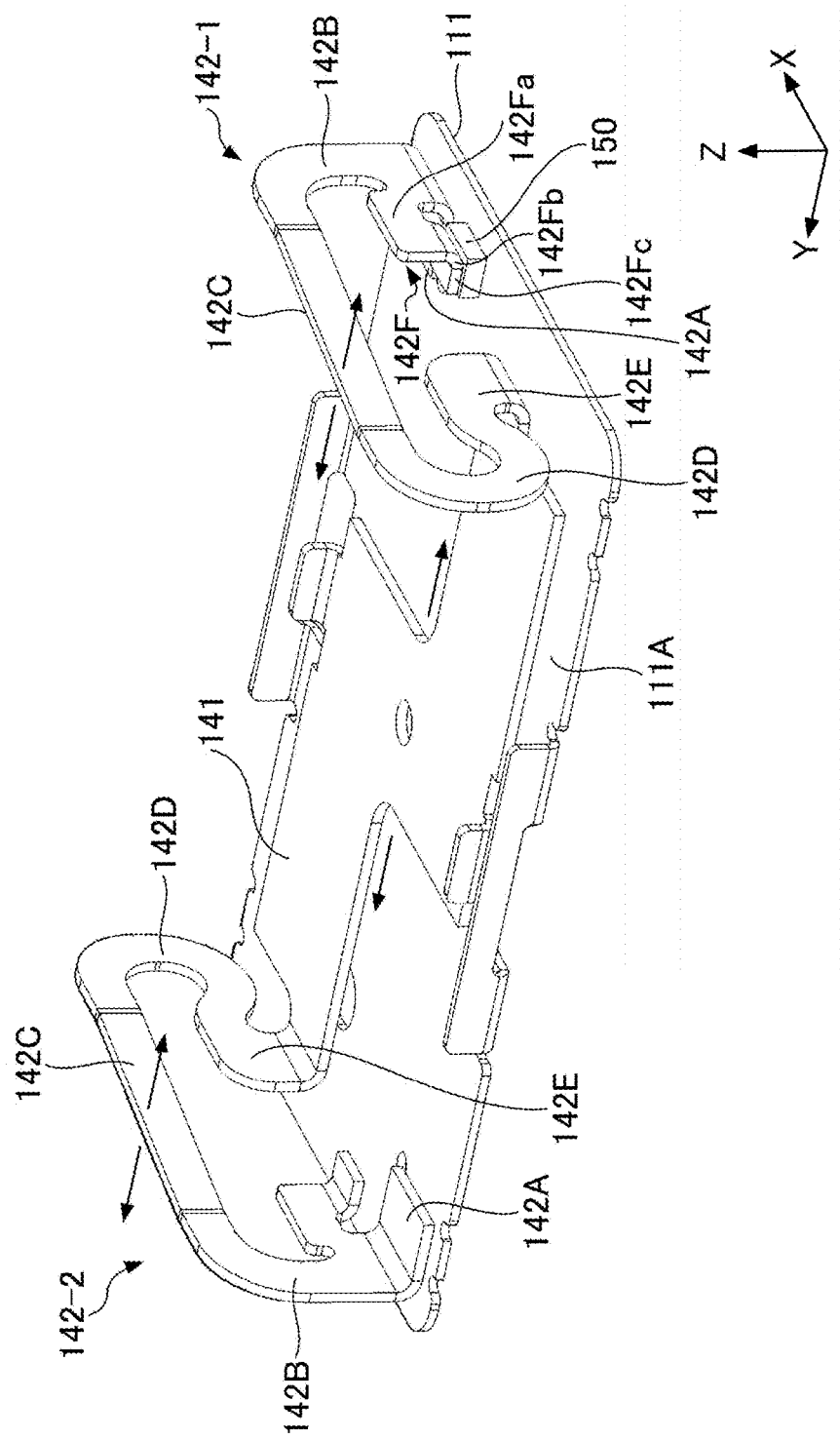
FIG. 9 is a perspective view of the outer appearance of the elastic support according to one embodiment, with the elastic support being fixed to a lower casing.
Figure 10:
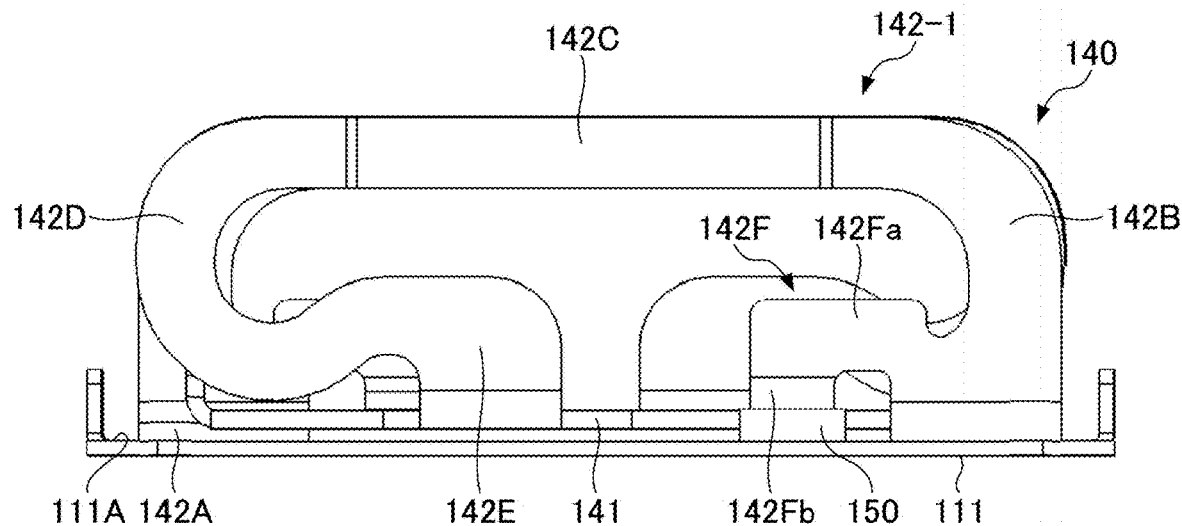
FIG. 10 is a rear side view of the elastic support according to one embodiment, with the elastic support being fixed to the lower casing.

FIG. 9 is a perspective view of the outer appearance of the elastic support 140 according to one embodiment, with the elastic support 140 being fixed to the lower casing 111. FIG. 10 is a rear side view of the elastic support 140 according to one embodiment, with the elastic support 140 being fixed to the lower casing 111.

In the elastic support 140 configured as described with reference to FIG. 7 and FIG. 8, as illustrated in FIG. 9 and FIG. 10, the fixed portion 142A included in the elastic arm 142-1 and the fixed portion 142A included in the elastic arm 142-2 are fixed to the upper surface 111A of the lower casing 111 through welding.

Thereby, the elastic support 140 is supported by the elastic arm 142-1 and the elastic arm 142-2 in a state in which the movable body-attaching portion 141 is horizontal and is slightly apart upward (positive Z-axis direction) from the lower casing 111.

When the elastic support 140 receives a vibrating force in the forward-backward direction (Y-axis direction) from the vibrator 120 attached to the movable body-attaching portion 141, mainly, the elastically deformable portion 142C elastically deforms and rocks in the forward-backward direction (Y-axis direction) with the fixed portion 142A being a fulcrum in the elastic arm 142-1 and the elastic arm 142-2. The elastically deformable portion 142C is a portion having a relatively low rigidity in the forward-backward direction (Y-axis direction). Thereby, the elastic support 140 can vibrate the movable body-attaching portion 141, supported by the elastic arm 142-1 and the elastic arm 142-2, in the forward-backward direction (Y-axis direction).

At this time, the vibration amount of the elastic arm 142-1 and the elastic arm 142-2 becomes the largest at a portion the farthest from the fixed portion 142A. Because the movable body-attaching portion 141 is connected near the portion the farthest from the fixed portion 142A, the movable body-attaching portion 141 can be relatively intensively vibrated in the forward-backward direction (Y-axis direction).

Here, as illustrated in FIG. 7 to FIG. 10, the elastic arm 142-1 of the elastic support 140 includes the projection 142F extending from the upright portion 142B in the leftward-rightward direction (negative X-axis direction in the case of the elastic arm 142-1). The projection 142F is located at a position near the lower-end portion (end portion on the negative Z-axis side) of the upright portion 142B, i.e., the position is different from the position of the elastically deformable portion 142C.

As illustrated in FIG. 2, FIG. 3, FIG. 9, and FIG. 10, the vibration generating device 10 according to one embodiment includes the buffer 150 between the projection 142F of the elastic arm 142-1 and the upper surface 111A of the lower casing 111.

Thereby, the vibration generating device 10 according to one embodiment can absorb the rocking motion of the elastic arm 142-1 in the upward-downward direction by the buffer 150. That is, even if the vibrator 120 is vibrated by what is called a sub resonance in the upward-downward direction (Z-axis direction) that is an unintended direction, the vibration in the upward-downward direction (Z-axis direction) is absorbed by the buffer 150. This can suppress the vibration in the upward-downward direction (Z-axis direction).

Among others, the vibration generating device 10 according to one embodiment uses a rubber member as the buffer 150.

Thereby, the vibration generating device 10 according to one embodiment can successfully suppress the vibration in the upward-downward direction (Z-axis direction) occurring in the vibrator 120.

In the vibration generating device 10 according to one embodiment, moreover, the projection 142F in the elastic arm 142-1 of the elastic support 140 is provided on the same side as the extending side of the elastically deformable portion 142C from the upright portion 142B (i.e., on the negative X-axis side) and is provided below the elastically deformable portion 142C.

Thereby, the vibration generating device 10 according to one embodiment can absorb the rocking motion of the elastic arm 142-1 by the buffer 150 at a position near the fixed portion 142A serving as a fulcrum of the rocking motion of the elastic arm 142-1. Therefore, it is possible to increase the effect of suppressing the vibration of the vibrator 120 in the upward-downward direction (Z-axis direction).

In addition, the buffer 150 in the vibration generating device 10 according to one embodiment contacts the projection 142F of the elastic arm 142-1 at a position near the fixed portion 142A serving as a fulcrum of the rocking motion of the elastic arm 142-1. Therefore, it is possible to reduce a frictional force applied from the buffer 150 to the elastic arm 142-1, and suppress an impact of the frictional force on the vibration of the vibrator 120 in the forward-backward direction (Y-axis direction).

Also, the elastic support 140 in the vibration generating device 10 according to one embodiment is a plate member. The projection 142F in the elastic arm 142-1 of the elastic support 140 includes a body plate 142Fa, a bent portion 142Fb, and a contact plate 142Fc. The body plate 142Fa extends integrally from the upright portion 142B.

The body plate 142Fa extends in the upward-downward direction (Z-axis direction) and in the leftward-rightward direction (X-axis direction). The contact plate 142Fc extends via the bent portion 142Fb from the body plate 142Fa. The contact plate 142Fc extends in the forward-backward direction (Y-axis direction) and in the leftward-rightward direction (X-axis direction) and contacts the buffer 150.

Thereby, the vibration generating device 10 according to one embodiment includes the plate member in which the projection 142F is formed integrally with the upright portion 142B and that is further bent at the bent portion 142Fb. Thus, it is possible to simply provide the projection 142F including the contact plate 142Fc, contacting the buffer 150 in a relatively large area, near the upright portion 142B and integrally with the upright portion 142B.

Note that, in the present embodiment, the buffer 150 is included between the projection 142F of the elastic arm 142-1 and the upper surface 111A of the lower casing 111, but the buffer 150 is not included between the projection 142F of the elastic arm 142-2 and the upper surface 111A of the lower casing 111. However, this is by no means a limitation. For example, the buffer 150 is included between the projection 142F of the elastic arm 142-1 and the upper surface 111A of the lower casing 111, and the buffer 150 may be included between the projection 142F of the elastic arm 142-2 and the upper surface 111A of the lower casing 111.

Modified Examples of the Configuration of the Elastic Arm 142-1

Figure 11:
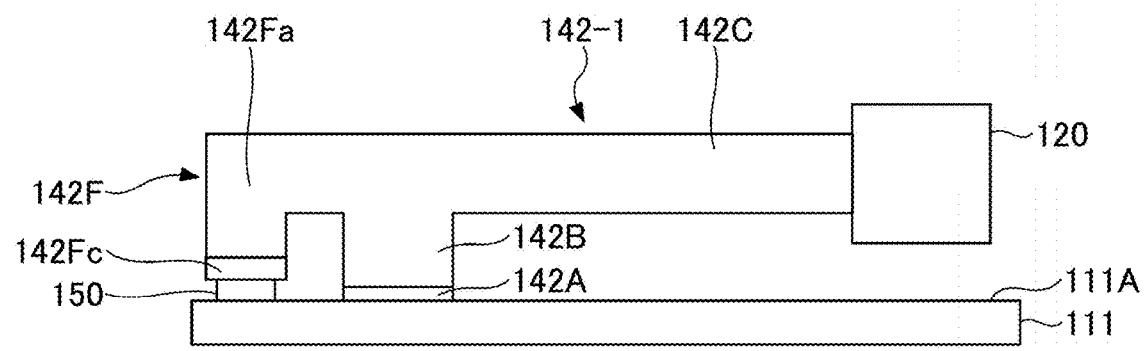
FIG. 11 is a view schematically illustrating a first modified example of a configuration of an elastic arm included in the elastic support according to one embodiment.
Figure 12:
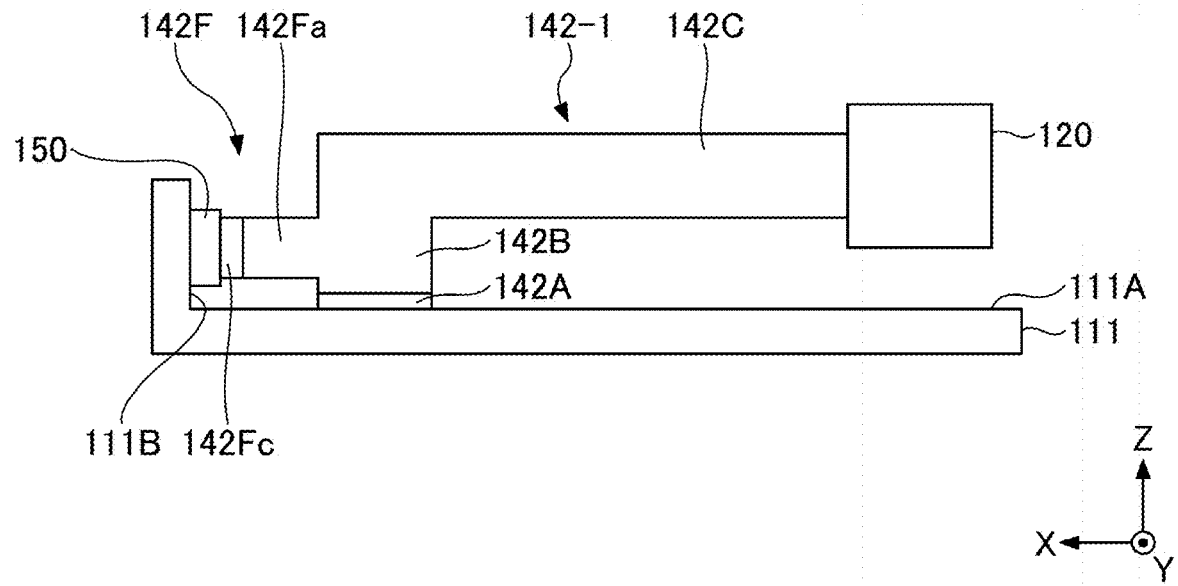
FIG. 12 is a view schematically illustrating a second modified example of the configuration of the elastic arm included in the elastic support according to one embodiment.
Figure 13:
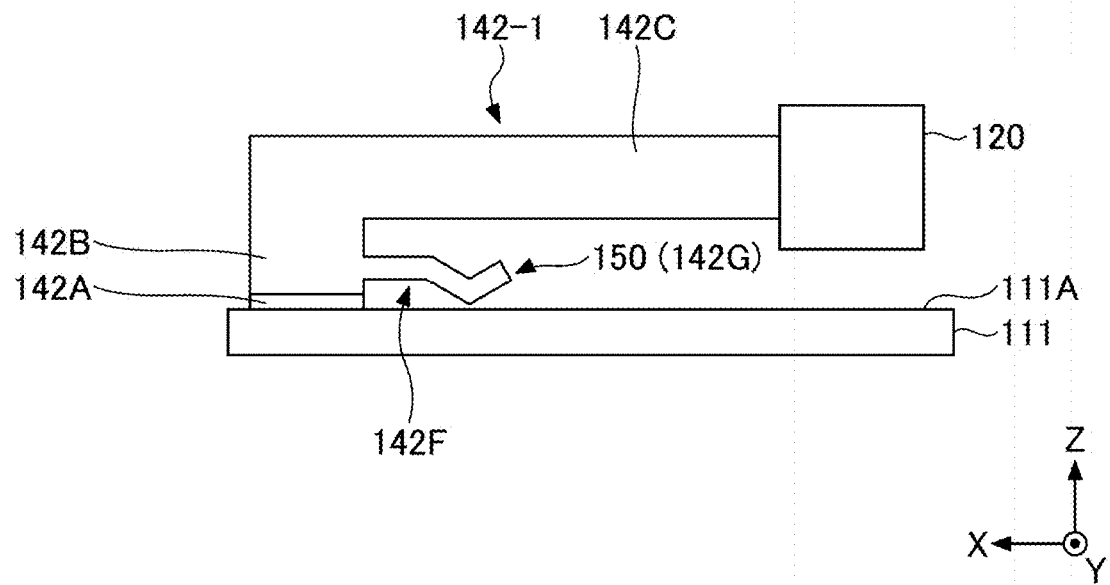
FIG. 13 is a view schematically illustrating a third modified example of the configuration of the elastic arm included in the elastic support according to one embodiment.

FIG. 11 is a view schematically illustrating a first modified example of the configuration of the elastic arm 142-1 included in the elastic support 140 according to one embodiment. FIG. 12 is a view schematically illustrating a second modified example of the configuration of the elastic arm 142-1 included in the elastic support 140 according to one embodiment. FIG. 13 is a view schematically illustrating a third modified example of the configuration of the elastic arm 142-1 included in the elastic support 140 according to one embodiment.

Note that, FIG. 11 to FIG. 13 illustrate, in a simplified manner, the shape of the elastic arm 142-1 included in the elastic support 140. Moreover, FIG. 11 to FIG. 13 illustrate, in a simplified manner, a state in which the vibrator 120 is connected to a tip of the elastic arm 142-1 (end portion on the negative Y-axis side).

In the examples as illustrated in FIG. 7 to FIG. 10, the projection 142F in the elastic arm 142-1 is extended on the same side as the extending side of the elastically deformable portion 142C from the upright portion 142B (i.e., on the negative X-axis side). However, this is by no means a limitation.

For example, as illustrated in FIG. 11 and FIG. 12, the projection 142F in the elastic arm 142-1 may be extended on the opposite side to the extending side of the elastically deformable portion 142C from the upright portion 142B (i.e., on the positive X-axis side).

In this case, as illustrated in FIG. 11, the projection 142F may extend downward (negative Z-axis direction) so that the buffer 150 is included between the projection 142F and the upper surface 111A of the lower casing 111.

Alternatively, as illustrated in FIG. 12, the projection 142F may extend in the positive X-axis direction so that the buffer 150 is included between the projection 142F and a wall surface 111B, which vertically extends from the upper surface 111A of the lower casing 111.

Also, in the examples as illustrated in FIG. 7 to FIG. 10, the buffer 150 is a member separate from the projection 142F of the elastic arm 142-1. However, this is by no means a limitation.

For example, as illustrated in FIG. 13, the buffer 150 may be a spring 142G extending integrally from the projection 142F of the elastic arm 142-1.

According to the vibration generating device according to one embodiment, it is possible to suppress a vibration in the upward-downward direction that is an unintended direction.

While embodiments of the present invention have been described above in detail, the present invention is not limited to these embodiments. Various changes or modifications are possible within the scope of the gist of the present invention recited in the claims.

What is claimed is:

1. A vibration generating device, comprising:
   a stationary body including a bottom surface;
   a movable body disposed in an upper space of the bottom surface; and
   an elastic support disposed between the stationary body and the movable body and configured to support the movable body so as to be vibratable in a forward-backward direction with respect to the stationary body, wherein
   the elastic support includes
      a fixed portion fixed to the bottom surface,
      an upright portion extending upward from the fixed portion,
      an elastically deformable portion extending from the upright portion in a leftward-rightward direction, and
      a movable body-attaching portion that extends from the elastically deformable portion and to which the movable body is attached,
   the elastic support includes a projection extending from the upright portion in the leftward-rightward direction at a position in the upright portion, the position being different from a position in the upright portion at which the elastically deformable portion extends from the upright portion in the leftward-rightward direction, and
   a buffer is included between the projection and the stationary body.

2. The vibration generating device according to claim 1, wherein the projection is provided on a same side as an extending side of the elastically deformable portion from the upright portion and is provided below the elastically deformable portion.

3. The vibration generating device according to claim 1, wherein
the elastic support is a plate member,
the projection includes a body plate, a bent portion, and a contact plate,
the body plate extends integrally from the upright portion and extends in an upward-downward direction and in the leftward-rightward direction, and
the contact plate extends via the bent portion from the body plate, and extends in the forward-backward direction and in the leftward-rightward direction and contacts the buffer.

4. The vibration generating device according to claim 1, wherein
the buffer is a rubber member.

5. The vibration generating device according to claim 1, wherein
the buffer is a spring extending integrally from the projection.

\* \* \* \* \*